Sept. 26, 1961 J. R. ANDERSON 3,002,182

FERROELECTRIC STORAGE CIRCUITS AND METHODS

Filed Dec. 10, 1956 3 Sheets-Sheet 1

INVENTOR
J. R. ANDERSON
BY
ATTORNEY

FERROELECTRIC STORAGE CIRCUITS AND METHODS

Filed Dec. 10, 1956 3 Sheets-Sheet 2

INVENTOR
J. R. ANDERSON
BY [signature]
ATTORNEY

Sept. 26, 1961 J. R. ANDERSON 3,002,182

FERROELECTRIC STORAGE CIRCUITS AND METHODS

Filed Dec. 10, 1956 3 Sheets-Sheet 3

INVENTOR
J. R. ANDERSON
BY
[signature]
ATTORNEY

United States Patent Office 3,002,182
Patented Sept. 26, 1961

3,002,182

FERROELECTRIC STORAGE CIRCUITS AND METHODS

John R. Anderson, Dayton, Ohio, assignor to Bell Telephone Laboratories, Incorporated, New York, N.Y., a corporation of New York Filed Dec. 10, 1956, Ser. No. 627,163
12 Claims. (Cl. 340—173.2)

This invention relates to electrical circuits and methods of operation for the storage of information and, more particularly, to such circuits and methods utilizing ferroelectric elements.

As disclosed in my Patent 2,717,372, issued September 6, 1955, ferroelectric substances, such as barium titanate, when subjected to an electric field, exhibit a relationship between electric field intensity and polarization of the general form of the hysteresis loop exhibited by ferromagnetic materials. By utilizing the ferroelectric material as a dielectric of a condenser or capacitor, this hysteresis loop can be used for storage and readout of information. Generally, as described in the above-mentioned application, the ferroelectric material is initially polarized in one direction; information is then stored by applying voltages to the electrodes of the condenser to reverse this polarization. The stored information is read out by applying voltages to the electrodes to restore the initial polarization.

A single crystal of ferroelectric material may be utilized to provide the dielectric for a large number of condensers; these condensers may be provided with common electrodes as disclosed in my Patent 2,717,373, issued September 6, 1955. These condensers may be arranged in a storage matrix and a particular condenser of the matrix chosen for storage of information by having a voltage of one polarity applied to the common electrode on one side of this condenser and a voltage of the opposite polarity applied to the common electrode on the other side of the condenser. A third voltage may then be applied across the condensers of sufficient magnitude and proper polarity to cause a return to the initial state of polarization of any ferroelectric material, the polarization of which has been reversed, thereby providing an output pulse indicating the stored information One of the major problems encountered in circuits utilizing ferroelectric matrices is that of reducing the effect of disturbing pulses on the remaining capacitors of the matrix. When a pulse is applied to a row electrode of a ferroelectric matrix and a complementary pulse is applied to a column electrode of the matrix, the effect of these pulses is additive at the capacitor which defines the intersection of this row and this column electrode. However, disturbing pulses are applied to all of the capacitors of the selected row in which "0's" are stored and other disturbing pulses are applied to all of the capacitors in the selected column. In "word ordered" storage, in which a number of digits are stored in a row of capacitors, disturbing pulses are applied to each capacitor connected to the selected row electrode and other disturbing pulses are applied to each capacitor connected to the selected column electrodes. These disturbing pulses are insufficient alone to reverse the remanent polarization of the disturbed capacitors, but these pulses partially switch each of the disturbed capacitors. The effect of this partial switching is cumulative and, if allowed to continue for a sufficient number of applied pulses, can become sufficient completely to reverse the polarization of disturbed capacitors, thus requiring that the information previously stored in these disturbed capacitors be restored. The effect of the disturbing pulses therefore defines the limit of the number of times that information may be stored or read out relative to the matrix before the information previously stored in disturbed capacitors must be restored.

Stated in another manner, the effect of disturbing pulses limits the size of matrix which may be employed. For example, if a 1,000 x 1,000 capacitor matrix were employed in word ordered storage and a cycle of storage operations applied, the capacitors would receive 999 disturbing pulses. If a 10,000 x 10,000 capacitor matrix were employed in the same manner, 9,999 disturbing pulses would be applied to the matrix.

I have discovered that, by employing pulsing circuits which apply a very small fraction of the storage pulse to the selected column electrode, such as one fourth the magnitude, $V_s$, required to switch the selected capacitor, and by employing pulsing circuits which apply pulses of opposite polarity and one fourth $V_s$ in magnitude to the remaining column electrodes, the effect of disturbing pulses on the remaining rows of capacitors is greatly reduced while disturbing pulses applied to the selected row of capacitors are only slightly increased. For example, in the instance of a matrix of capacitors each requiring a potential difference $V_s$ of 12 volts completely to reverse the remanent polarization, the row electrodes would normally be maintained at ground potential and a pulse of 9 volts would be applied to the selected row electrode. Pulses of −3 volts would be applied to the selected column electrodes while pulses of +3 volts would be applied to the remaining column electrodes. Accordingly, the disturbance on the remaining capacitors in the selected row would be 6 volts while the disturbance on all other remaining capacitors would be only 3 volts.

A careful analysis of the disturbance problem indicates that the disturbance on priorly stored words in the matrix is the result of pulses applied to the column electrodes and that this disturbance can be minimized while only slightly increasing the disturbance on the selected word capacitors by employing pulse sources which apply pulses of $$\pm\frac{V_s}{4}$$

magnitude to the column electrodes. Thus, the disturbing effects are slightly increased at the selected row electrodes during the storing process which occurs only once while the disturbance on the priorly stored words is decreased, which latter disturbance takes place every time a word is stored in another row of the matrix.

I have further discovered that, by employing pulse sources connected to the column electrodes which always apply pulses of opposite polarity to the pulses previously applied to those respective column electrodes, hereinafter called bidirectional pulses, the effect of disturbing pulses can be virtually eliminated. Advantageously, these pulses may be in the range of $$\frac{V_s}{3} \text{ to } \frac{V_s}{4}$$

I have also discovered that the effect of disturbing pulses in single bit storage may be virtually eliminated by applying, in addition to the disturbance compensating pulses mentioned in the immediately prior paragraph, $$\frac{V_s}{4}$$

disturbance compensating pulses to the remaining column electrodes of the same polarity and substantially coincident with the application of a readout pulse to a selected row electrode.

Accordingly, it is an object of this invention to provide improved ferroelectric storage circuits.

It is another object of this invention to provide improved pulsing circuits for ferroelectric matrices which reduce the effect of disturbing pulses on the matrix.

It is another object of this invention to provide improved methods of storage in ferroelectric circuits.

It is a further object of this invention to provide improved pulse techniques for storage circuits including ferroelectric matrices, which techniques minimize or compensate for the effect of disturbing pulses.

Briefly, in accordance with certain aspects of this invention, a first pulse source applies to a selected row electrode a store pulse approximately three fourths $V_s$, the magnitude of pulse required completely to reverse the remanent polarization of the capacitors, and a second pulse source applies concurrent complementary store pulses of one fourth $V_s$ to the selected column electrodes. No disturbing pulse is applied to the selected capacitors of the selected row during the storage in these capacitors. Simultaneously with the application of this complementary pulse to the selected column electrodes, the second pulse source applies disturbance compensating pulses to the remaining column electrodes. These disturbance compensating pulses are equal in magnitude to the complementary store pulses (one fourth $V_s$) but are of opposite polarity from the complementary store pulses. These disturbance compensating pulses effectively cancel or countreact a portion of the store pulses applied to the remaining capacitors in the selected row such that a resultant disturbing pulse of one half $V_s$ is applied to each of the remaining capacitors in the selected row. In each of the capacitors of the remaining rows, however, the resultant disturbing pulse is only one fourth $V_s$.

In accordance with other aspects of this invention, the row and column electrodes of a ferroelectric matrix are normally maintained at ground or reference potential and a store pulse in the range of $$\frac{2V_s}{3} \text{ to } \frac{3V_s}{4}$$

is applied to the selected row electrode while complementary store pulses which combine with the store pulses to equal or exceed $V_s$ are applied to selected column electrodes and disturbance compensating pulses equal in magnitude and opposite in polarity to the complementary store pulses are applied to the remaining column electrodes. The pulses applied to the selected column electrodes are followed by disturbance compensating pulses equal in magnitude and opposite in polarity to the complementary store pulses while the pulses previously applied to the remaining column electrodes are followed by disturbance compensating pulses equal in magnitude and of the same polarity as the complementary store pulses. Utilizing circuitry adapted to this bidirectional pulsing technique, the disturbance applied to any capacitor is always compensated by an immediately subsequent compensating pulse. These compensating pulses, however, are insufficient partially to switch a capacitor in which a binary digit has been stored and thus do not, of themselves, produce additional disturbance.

Thus, in accordance with the foregoing aspects of this invention, it is apparent that the effect of disturbing pulses in word ordered storage is virtually eliminated by applying disturbance compensating pulses to all capacitors in which no digits are then being stored substantially simultaneously with the combination of store pulses. Additionally, other disturbance compensating pulses may be applied to all column elcetrodes of the matrix opposite in polarity to the previously applied pulses and subsequent to the application of the store pulses.

In accordance with still another aspect of this invention, the effect of disturbing pulses in single bit storage is virtually eliminated. The row and column electrodes are normally maintained at ground or reference potential and a $$+\frac{3V_s}{4}$$

store pulse is applied to the selected row electrode while a $$-\frac{V_s}{4}$$

store pulse is applied to the selected column electrode and concurrent $$+\frac{V_s}{4}$$

pulses are applied to the remaining column electrodes. Disturbance compensating pulses may also be applied subsequent to the store or read-in operation. These pulses are $$+\frac{V_s}{4}$$

at the selected column electrode while $$-\frac{V_s}{4}$$

disturbance compensating pulses are applied to the remaining column electrodes. When it is desired to read out the information stored in a selected capacitor, a $-V_s$ pulse is applied to the selected row electrode while $$-\frac{V_s}{4}$$

disturbance compensating pulses are applied to those column electrodes not connected to the selected capacitor.

By elimination of the effect of disturbing pulses, numerous advantages are achieved. For example, low remanance capacitors, which would otherwise be useless for matrices, may be employed in a matrix or the number of storage-readout cycles on presently used matrices may be increased by several orders of magnitude. Alternatively, matrices, several orders of magnitude larger than those presently in use, may be employed.

It is a feature of this invention to employ, with a ferroelectric matrix, pulse sources which apply driving pulses to a selected row electrode of three fourths $V_s$, where $V_s$ is the magnitude required completely to reverse the polarization of the capacitor and to employ other pulse sources which apply complementary pulses of magnitude one fourth $V_s$ to the selected column electrodes and apply disturbance compensating pulses to the remaining column electrodes of the matrix of magnitude one fourth $V_s$ opposite in polarity to the complementary pulses.

It is another feature of this invention to reduce the effect of disturbing pulses by connecting the rows and columns of the matrix to ground through resistors and employing pulse sources which always apply $$\frac{V_s}{4}$$

pulses to the column electrodes opposite in polarity to those previously applied to the respective column electrodes.

It is another feature of this invention to achieve word ordered storage by applying a storage pulse to a selected row electrode in the range of three fourths $V_s$ to two thirds $V_s$, where $V_s$ is the magnitude of pulse required to store a pulse in a selected capacitor; to apply complementary store pulses to selected column electrodes of a magnitude sufficient to combine with the store pulse to equal or exceed $V_s$; to apply pulses to all of the remaining column electrodes opposite in polarity and equal in magnitude to the complementary pulses and subsequently to apply pulses to each of the column electrodes opposite in polarity and equal in magnitude to the pulses previously applied to the respective column electrodes.

It is still another feature of this invention to reduce the effect of disturbing pulses in single bit storage and readout by applying disturbance compensating pulses to all those column electrodes not connected to the selected capacitor during storage and readout as well as to apply disturbance compensating pulses to all the column electrodes subsequent to the read-in or store operation.

A complete understanding of this invention and of these and various other features thereof may be gained from consideration of the following detailed description and the accompanying drawing in which.

Figure 1:
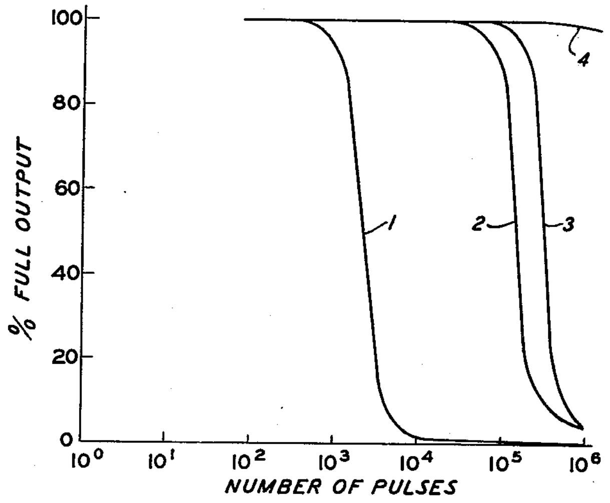
FIG. 1 is a graphical representation of the percentage of output charge switched by a capacitor when subjected to the pulse techniques in accordance with this invention as compared to the percentage of output charge utilizing pulse techniques known in the art.

Referring now to FIG. 1, there is depicted in graphical form a comparison of the output obtained from a ferroelectric capacitor using unidirectional pulses and the same ferroelectric capacitor using either bidirectional pulses or unidirectional pulses of a decreased magnitude. The abscissa of this graph represents the number of applied pulses while the ordinate represents the percentage of the full output pulse obtained from the storage capacitor. Curve 1 is the response of a ferroelectric capacitor to unidirectional pulses of the order of 3.3 volts. For this particular capacitor, the magnitude of pulse $V_s$, required completely to reverse the polarization of the capacitor, is 10 volts. This pulse of 3.3 volts is equal to $$\frac{V_s}{3}$$

This plot depicts the effect of unidirectional disturbing pulses encountered when utilizing a pulse technique known in the art. Curve 2 represents the response of this same ferroelectric capacitor to bidirectional pulses of 3.3 volts or $$\frac{V_s}{3}$$

magnitude, while curve 3 represents the response of the same capacitor to unidirectional pulses of 2.5 volts or $$\frac{V_s}{4}$$

magnitude. Curve 4 represents the response of the same capacitor to bidirectional pulses of $$\frac{V_s}{4}$$

magnitude.

From curve 1, it is to be observed that 1,000 unidirectional pulses of magnitude $$\frac{V_s}{3}$$

partially switch the capacitor reducing the output to the order of 95 percent of full output. After 10,000 pulses, the output of the capacitor is reduced below 5 percent of its full output, indicating that the disturbing pulses will completely reverse the remanent polarization of the capacitor. If, however, as depicted in curve 2, bidirectional pulses of $$\frac{V_s}{3}$$

magnitude are employed, the output is only reduced to approximately 90 percent after 100,000 pulses, and the capacitor is not completely reversed until the pulses are of the order of 1,000,000. When unidirectional pulses of $$\frac{V_s}{4}$$

magnitude are employed, as depicted in curve 3, the output does not begin to decrease until more than 100,000 pulses are applied.

A comparison of curves 1, 2, 3, and 4 illustrates the cumulative effect of repeated disturbing pulses on the remaining capacitors in a matrix. Further, such comparison illustrates the distinct difference in results obtained from the use of disturbance compensating pulses in accordance with this invention (curves 2 and 4) as compared to those known in the art (curve 1).

Figure 4:
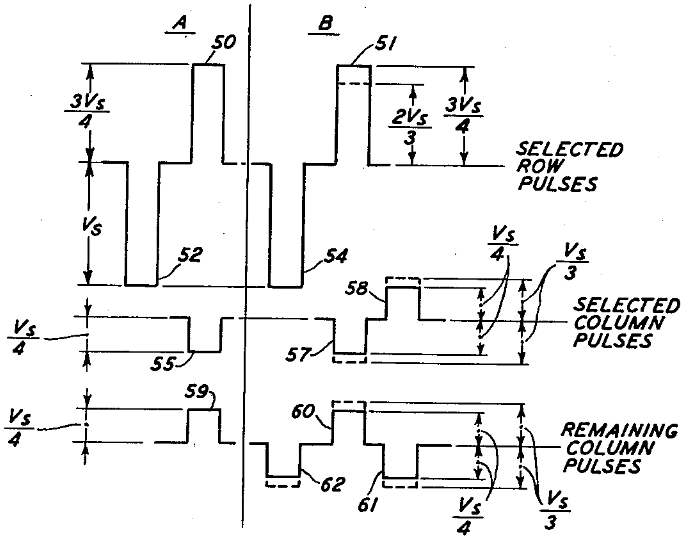
FIGS. 4A and 4B depict time plots of applied pulses in accordance with specific illustrative pulse techniques of this invention.
Figure 2:
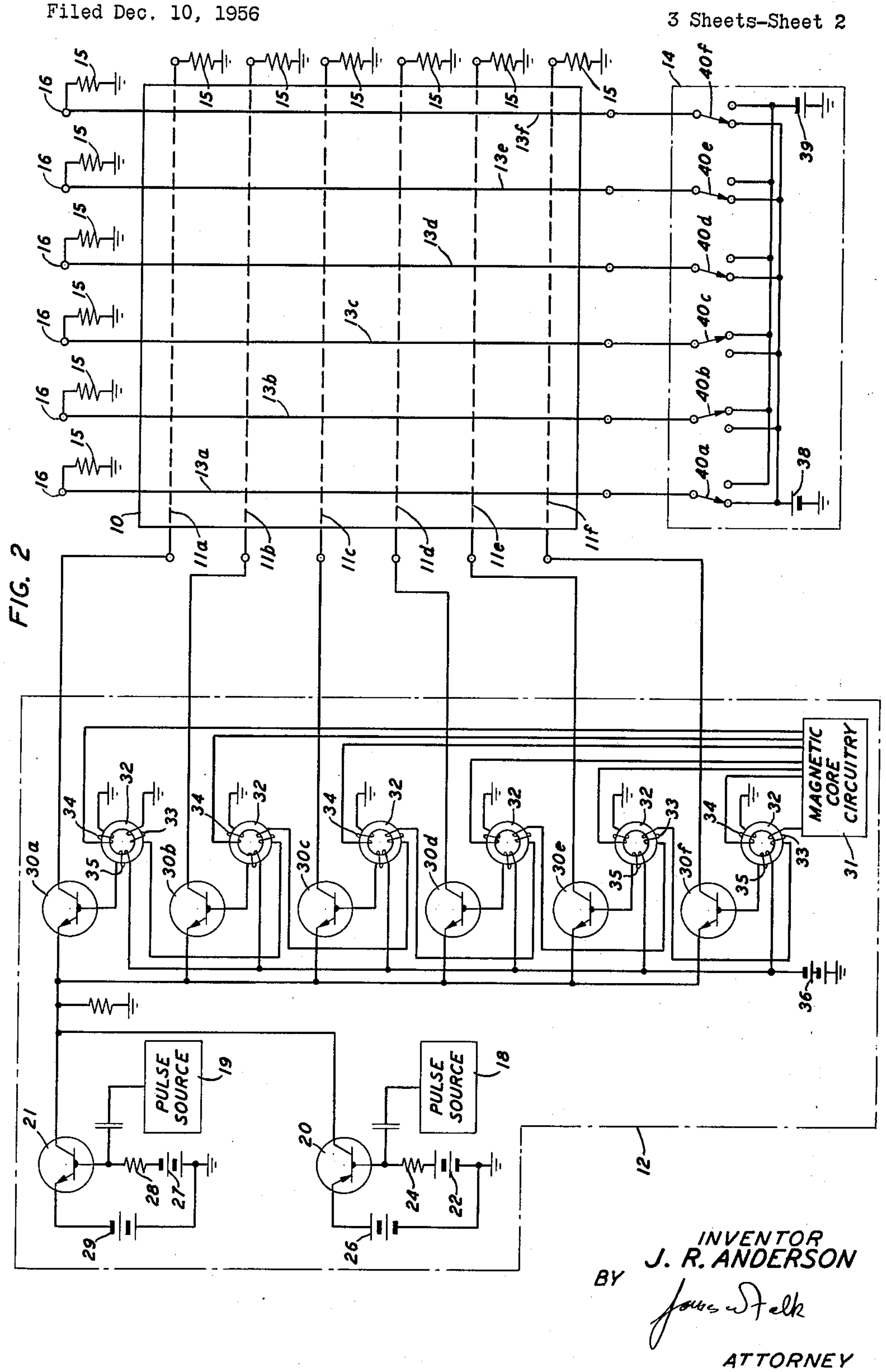
FIG. 2 is a combined schematic and block representation of a ferroelectric storage circuit in accordance with one specific illustrative embodiment of this invention.

FIG. 2 depicts a combined schematic and block representation of a ferroelectric storage circuit in accordance with one illustrative embodiment of this invention including a ferroelectric storage matrix comprising a slab 10 of a ferroelectric material having row electrodes 11 and column electrodes 13 on opposite surfaces thereof defining, at their several intersections, discrete ferroelectric capacitors, and pulsing circuits 12 and 14 connected to the row and column electrodes, respectively. Individual resistors 15 are connected to each of the row and column electrodes and to a source of reference potential. Pulsing circuit 12 may be designated as the driving pulse circuit which supplies store pulses such as pulses 50 and 51 shown in FIGS. 4A and 4B, respectively, and supplies readout pulses of $V_s$ magnitude such as pulses 52 and 54 shown in FIGS. 4A and 4B, respectively. Pulsing circuit 12 may be any convenient type and, as herein depicted, is of the type disclosed in my application Serial No. 524,081, filed July 25, 1955, now Patent 2,938,194, issued May 24, 1960. Pulsing circuit 14 supplies complementary store pulses such as pulses 55 and 57 shown in FIGS. 4A and 4B, respectively, and may supply disturbance compensating pulses such as pulse 58 shown in FIG. 4B to the selected column electrodes. Pulsing circuit 14 may also supply disturbance compensating pulses such as pulses 59, 60, 61, and 62 (shown in FIGS. 4A and 4B) to the remaining column electrodes. The methods of applying combinations of the pulses shown in FIGS. 4A and 4B, by which methods the disturbing pulses are virtually eliminated, will be subsequently explained.

Figure 3:
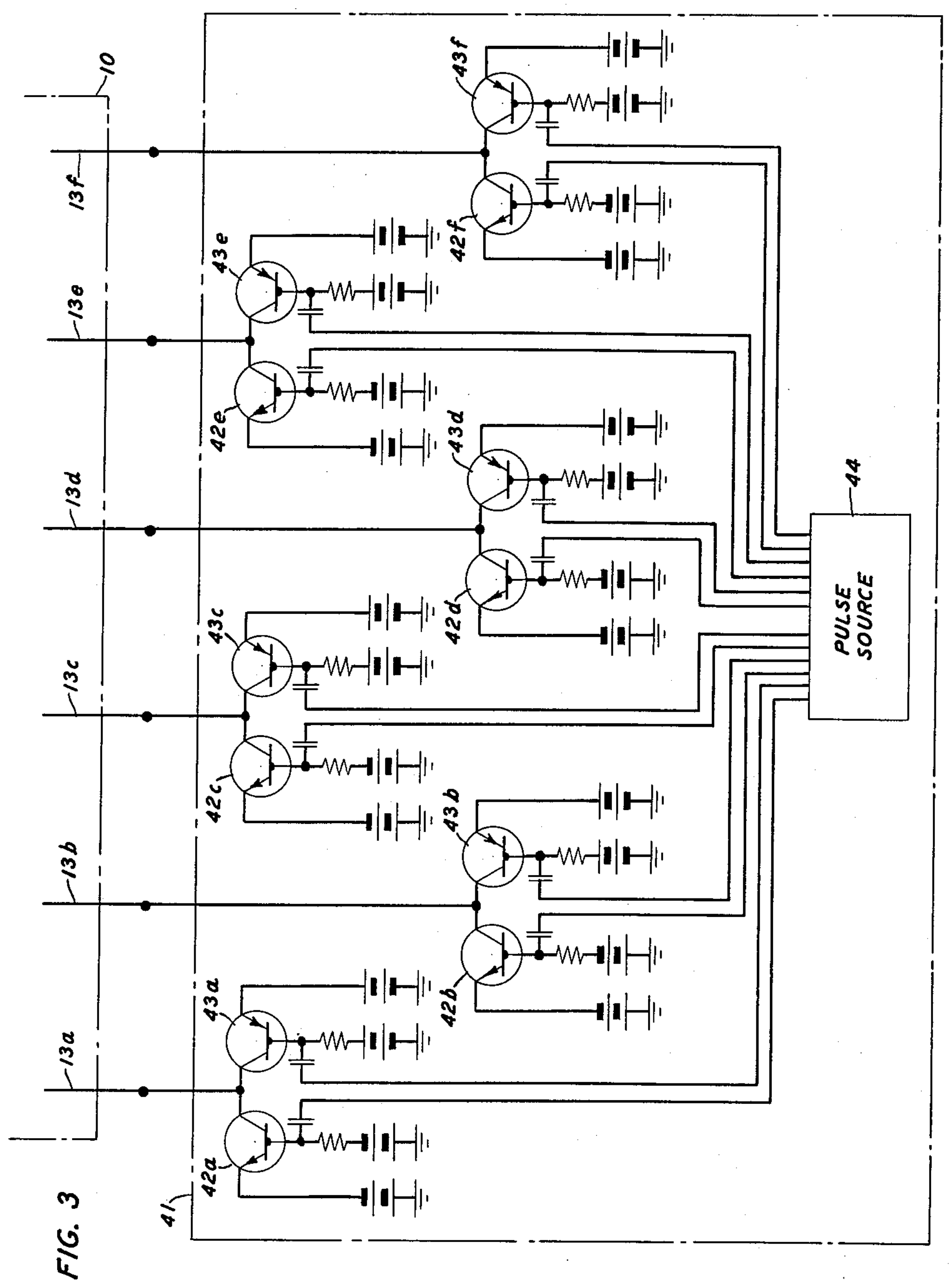
FIG. 3 is a combined schematic and block representation of another illustrative circuit for applying pulses to the matrix column electrodes in accordance with this invention.

Output terminals 16 are connected intermediate the column electrodes 13 and the associated resistors 15. Output terminals 16 may be connected to any suitable circuitry which is adapted to detect the "0's" and "1's" delivered to the respective output terminals. Pulse sources 18 and 19 may be of any convenient type and are connected to the bases of transistors 20 and 21, respectively. Transistors 20 and 21, which are of the p–n–p and n–p–n type, respectively, are employed as constant voltage switching circuits selectively to apply positive and negative pulses respectively to the emitters of n–p–n transistors 30 upon the application of negative and positive pulses from sources 18 and 19, respectively. Source 22 of positive potential is connected to the base of transistor 20 through resistor 24. A source 26 of positive potential is connected to the emitter of transistor 20. Source 27 of negative potential is connected to the base of transistor 21 through resistor 28 while source 29 of negative potential is connected to the emitter of transistor 21. The relationships of these potentials are such that transistors 20 and 21 are normally non-conducting when no pulses are applied to their bases. Magnetic core circuitry 31 is coupled through two individual windings 33 and 34 to each of magnetic cores 32. Core windings 33 are all connected in series between magnetic core circuitry 31 and ground while windings 34 are individually connected between magnetic core circuitry 31 and ground. Transistors 30 are also coupled to magnetic cores 32 through individual windings 35. Source 36 of potential is connected to each of the bases of transistors 30 through the associated individual core windings 35. Source 36 normally maintains each of transistors 30 in a non-conducting condition. In order to gate or render conducting one of transistors 30, a first pulse is applied to windings 33 of each of cores 32. Concurrently, with this first pulse, a second pulse is delivered to winding 34 of the selected core 32. The combination of the first and second pulses applies a pulse through the selected magnetic core 32 to the winding 35 connected to the base of the associated transistor 30. This pulse on the base of selected transistor 30 renders that transistor conducting permitting the passage of a pulse from either transistors 20 or 21 to the selected row electrode 11. If a positive pulse is to be applied to the selected row electrode, a selected transistor 30 is rendered conducting and pulse source 18 applies a concurrent gating pulse to transistor 20, and source 26 delivers a positive pulse such as pulse 50, shown in FIG. 4, through the selected transistor 30 to the selected row electrode. Source 38 and 39 are convenient sources of positive and negative pulses respectively. These pulses may be applied to column electrodes 13 by completing the appropriate circuit through switches 40. For example, switches 40*a*, 40*d*, 40*e*, and 40*f* are shown in a position to complete a path to source 38 thereby applying positive pulses to the associated column electrodes 13*a*, 13*d*, 13*e*, and 13*f*, respectively. Also switches 40*b* and 40*c* are shown in a position to complete a path to source 39 thereby applying a negative pulse to the associated column electrodes 13*b* and 13*c*, respectively. While pulsing circuit 14, as depicted in FIG. 2, employs sources of potential and switches to apply positive and negative pulses to column electrodes 13, numerous other types of circuitry may be employed; one such example of an alternative pulsing circuit is shown in FIG. 3.

The operation of the storage and readout cycle together with disturbance compensation in the illustrative circuit of FIG. 2 may be in accordance with any one of several methods. For example, a $$+\frac{3V_s}{4}$$

pulse such as pulse 50 shown in FIG. 4A may be applied by transistor 20 through one of gating transistors 30, for example transistor 30*b*, to a selected row electrode while pulsing circuit 14 applies $$-\frac{V_s}{4}$$

complementary store pulses, such as pulse 55 shown in FIG. 4A, to the selected column electrodes. Substantially simultaneously with the above-mentioned pulses, pulsing circuit 14 also applies a $$+\frac{V_s}{4}$$

disturbance compensating pulse, such as pulse 59 shown in FIG. 4A, to the remaining column electrodes. The disturbance compensation effect of this pulse technique is depicted by curve 3 of FIG. 1.

In accordance with another method of operation of the circuit of FIG. 2, a positive store pulse in the range of $$\frac{2V_s}{3} \text{ to } \frac{3V_s}{4}$$

such as pulse 51 shown in FIG. 4B, may be applied to the selected row electrode while negative complementary store pulses in the range of $$\frac{V_s}{3} \text{ to } \frac{V_s}{4}$$

such as pulse 57 shown in FIG. 4B and positive pulses in the range of $$\frac{V_s}{3} \text{ to } \frac{V_s}{4}$$

such as pulse 60 shown in FIG. 4B are applied to the selected and remaining column electrodes respectively. Subsequent to the application of these pulses, pulsing circuit 14 applies disturbance compensating pulses in the range of $$\frac{V_s}{3} \text{ to } \frac{V_s}{4}$$

such as positive pulse 58 shown in FIG. 4B and negative pulses in the range of $$\frac{V_s}{3} \text{ to } \frac{V_s}{4}$$

such as pulse 61 shown in FIG. 4B to the selected and remaining column electrodes respectively. The store pulse and the complementary store pulses should be so selected from these ranges that the combination of store and complementary store pulses equals or exceeds $V_s$. The remaining pulses should be of approximately the same magnitude as the complementary store pulses. The disturbance compensation effect of this bidirectional pulse technique will be in a range between curves 2 and 4 of FIG. 1, depending on the particular value of pulses applied to the column electrodes, curve 2 depicting the effect of $$\frac{V_s}{3}$$

column pulses and curve 4 depicting the effect of $$\frac{V_s}{4}$$

column pulses. Additionally, the latter method of disturbance compensation (which includes the application of disturbance compensating pulses 58 and 61, shown in FIG. 4B, immediately subsequent to the store operation) reduces the effect of disturbing pulses on all capacitors of the matrix. Disturbance compensating pulses 58, 60, and 61 do not cause any disturbance. However, they assure maximum reduction of disturbance because the pulses applied to any column electrode are always bidirectional as was explained with regard to curves 2 and 4 of FIG. 1.

Still another method of operation of the illustrative circuit of FIG. 2 is that of storage and readout relative to the matrix on a bit-at-a-time basis. In accordance with this method, pulses in accordance with the above-mentioned method, in which ranges of magnitudes may be applied, are employed. Additionally, negative pulses such as pulse 62, shown in FIG. 4B, of the same magnitude as the complementary store pulses are applied to the remaining column electrodes substantially simultaneously with the application of a readout pulse to a selected row electrode.

In order to read out or sense the stored information in either of the above-mentioned methods of operation, pulsing circuit 12 applies a $-V_s$ pulse such as pulse 52, shown in FIG. 4A, to any one of the previously selected row electrodes to read out the information previously stored in that row in a manner well known in the art. The resultant pulses or digits will be delivered to output terminals 16 connected to the respective column electrodes.

It is understood that a binary "1" is stored in each of the selected capacitors while a binary "0" is stored in each of the remaining capacitors of the selected row. Binary "0's" are, of course, stored in all capacitors of a row in response to the application of a clear or readout pulse to this row. Thus, in word ordered storage in accordance with the first-mentioned methods of operation of this circuit, the remaining capacitors in the selected row (those in which a binary "0" is stored) will have applied across them $$+\frac{3V_s}{4}$$

pulse 50 and $$+\frac{V_s}{4}$$

pulse 59 with the resultant positive pulse equal to one half $V_s$ while the disturbing pulses on the remaining columns of the matrix will never exceed $$\pm\frac{V}{4}$$

It should be noted that the disturbing pulse of $$\frac{V_s}{2}$$

volts amplitude occurs only once for each stored binary "0" and, of course, never for a stored binary "1."

Referring now to FIG. 3, there is depicted, in accordance with another illustrative embodiment of this invention, pulsing circuit 41 for selectively applying positive and negative pulses to the column electrodes of matrix 10. Transistors 42*a* through 42*f* and transistors 43*a* through 43*f* are connected in circuitry similar to transistors 21 and 20, respectively, and may be triggered by a pulse from any convenient pulse source such as pulse source 44 connected to the base electrodes of transistors 42 and 43. If it is desired to apply a complementary store pulse to one of the column electrodes, pulse source 44 applies a gating pulse to the transistor 42 connected to that column electrode and this transistor is in turn triggered causing a negative pulse to be applied to the selected column electrode. If, however, it is desired to apply a positive pulse to that column electrode, then transistor 43 connected to that column electrode is triggered by a pulse from source 44. Additionally, it may be desired to apply subsequent pulses of opposite polarity and equal magnitude to the respective column electrodes which may be accomplished by the application of pulses from pulse source 44 to the other transistors 42 or 43, as the case may be, connected to the respective column electrodes. Thus, pulsing circuit 41 may be employed in accordance with any of the above-mentioned pulsing techniques in accordance with this invention.

It is to be understood that the above-described arrangements are illustrative of the application of the principles of the invention. Numerous other arrangements may be devised by those skilled in the art without departing from the spirit and scope of the invention.

What is claimed is:

1. An electrical circuit for storing binary information including a plurality of ferroelectric capacitors connected together to have rows and columns of electrodes, first pulse means connected to each of said row electrodes for supplying readout and partial store pulses to said row electrodes, and second pulse means connected to said column electrodes for supplying complementary store pulses to selected column electrodes, said second pulse means further including means for applying disturbance compensating pulses to each of said column electrodes subsequent to the application of said store pulses.

2. An electrical circuit in accordance with claim 1 wherein said second pulse means includes means for applying a disturbance compensating pulse to certain of said column electrodes substantially simultaneously with the application of said readout pulses.

3. An electrical circuit for storing binary information including a plurality of ferroelectric capacitors connected together to have rows and columns of electrodes, first pulse means connected to each of said row electrodes for supplying readout and partial store pulses to selected row electrodes, and second pulse means connected to said column electrodes for applying complementary store pulses to selected column electrodes and for applying disturbance compensating pulses to the remaining column electrodes substantially simultaneously with the application of said store pulses, said second pulse means including means for applying disturbance compensating pulses to said selected column electrodes opposite in polarity to said complementary store pulses, said second pulse means further including means for applying additional disturbances compensating pulses to said remaining column electrodes opposite in polarity to said first-mentioned disturbance compensating pulses.

4. An electrical circuit in accordance with claim 3 wherein said second pulse means includes means for applying disturbance compensating pulses to said remaining column electrodes simultaneously with the application of a readout pulse to one of said row electrodes.

5. An electrical circuit for storing binary information including a plurality of ferroelectric capacitors connected together to have rows and columns of electrodes, first pulse means connected to each of said row electrodes for applying a partial store pulse of a magnitude in excess of $$\frac{V_s}{2}$$

to a selected row electrode where $V_s$ is the switching voltage of said capacitors, and second pulse means connected to said column electrodes for applying a complementary store pulse to selected column electrodes, said second pulse means including means for applying a first and a second disturbance compensating pulse to the remaining column electrodes.

6. An electrical circuit for storing binary information including a plurality of ferroelectric capacitors connected together to have rows and columns of electrodes, first pulse means connected to each of said row electrodes for applying store pulses of $$\frac{3V_s}{4}$$

magnitude where $V_s$ is the magnitude of pulse required completely to reverse the remanent polarization of each of said plurality of capacitors, and second pulse means connected to each of said column electrodes for supplying complementary store pulses of $$\frac{V_s}{4}$$

magnitude to selected column electrodes, said second pulse means including means for supplying disturbance compensating pulses of $$\frac{V_s}{4}$$

magnitude and of opposite polarity with respect to said complementary store pulses to the remaining column electrodes.

7. An electrical circuit in accordance with claim 6 wherein said second pulse means includes means for applying pulses subsequent to said complementary store pulses and opposite in polarity to said complementary store pulses to said selected column electrodes and further includes means for applying pulses subsequent to said disturbance compensating pulses and opposite in polarity to said disturbance compensating pulses to the remaining column electrodes.

8. An electrical circuit in accordance with claim 7 wherein said second pulse means includes means for applying additional disturbance compensating pulses of $$\frac{V_s}{4}$$

magnitude to said remaining column electrodes substantially simultaneously with the application of a readout pulse of $V_s$ magnitude from said first pulse means.

9. An information storage circuit comprising a plurality of ferroelectric capacitors connected between row and column electrodes in a matrix array, first and second pulse means connected to said row and column electrodes respectively, means for causing said first pulse means to apply to a selected row electrode a partial store pulse of magnitude less than the switching voltage of said capacitors but greater than one-half said switching voltage, means for causing said second pulse means to apply to selected column electrodes a complementary store pulse of magnitude less than one-half the switching voltage of said capacitors to selected column electrodes, said partial and complementary store pulses being sufficient in combination to switch the capacitors between said selected row and column electrodes, and means for subsequently causing said second pulse means to apply disturbance compensation pulses to all of said column electrodes of amplitude sufficient to compensate for disturbing pulses in unswitched capacitors.

10. An electrical circuit for storing binary information including a plurality of ferroelectric capacitors connected together to have rows and columns of electrodes, first pulse means connected to each of said row electrodes for applying a partial store pulse to a selected row electrode, and second pulse means connected to said column electrodes for applying a complementary store pulse to selected column electrodes, said second pulse means including means for applying a first disturbance compensating pulse to the remaining column electrodes substantially simultaneously with said store pulses and means for applying a second disturbance compensating pulse to said remaining column electrodes subsequent to said store pulses.

11. An electrical circuit in accordance with claim 10 wherein said second pulse means includes means for applying said second disturbance compensating pulse opposite in polarity to said first disturbance compensating pulse.

12. An electrical circuit in accordance with claim 10 wherein said first pulse means includes means for applying a readout pulse to a selected row electrode and wherein said second pulse means further includes means for applying a third disturbance compensating pulse to said remaining column electrodes substantially simultaneously with the application of said readout pulse.

References Cited in the file of this patent

UNITED STATES PATENTS

| | | |
|---|---|---|
| 2,691,154 | Rajchman | Oct. 5, 1954 |
| 2,736,880 | Forrester | Feb. 28, 1956 |
| 2,918,655 | Pulvari | Dec. 22, 1959 |

FOREIGN PATENTS

| | | |
|---|---|---|
| 162,314 | Australia | Mar. 31, 1955 |